Jan. 19, 1965  K. HEHL  3,165,785
RECIPROCABLE SCREW TYPE INJECTION MOLDING UNIT
Filed June 4, 1962  4 Sheets-Sheet 2
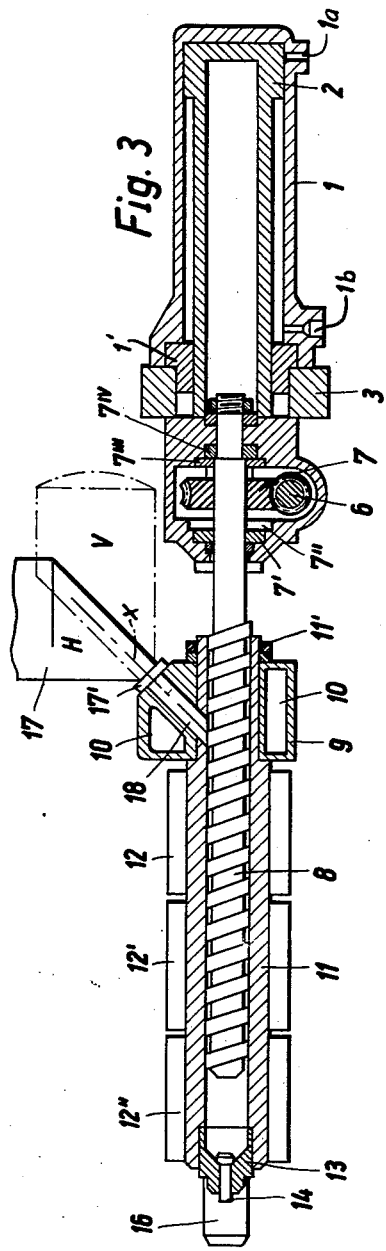
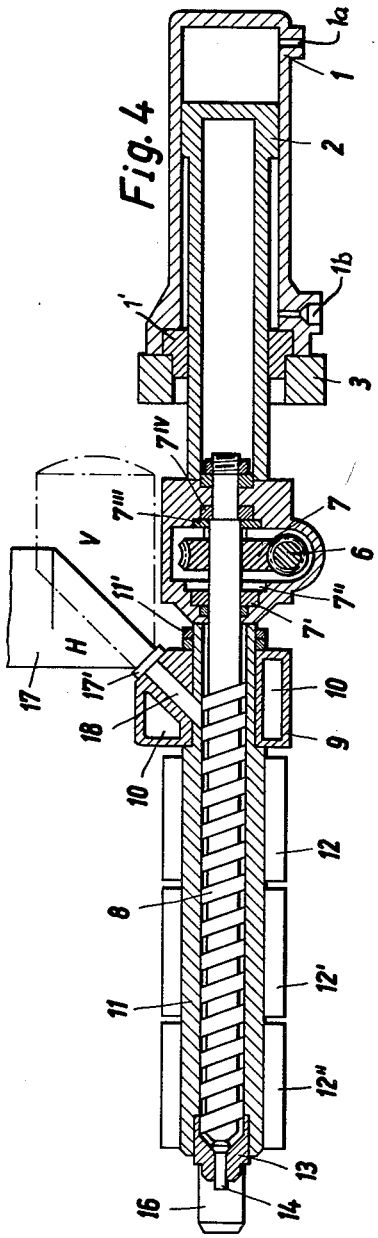
INVENTOR
Karl Hehl
BY *George B. Spencer*
ATTORNEY

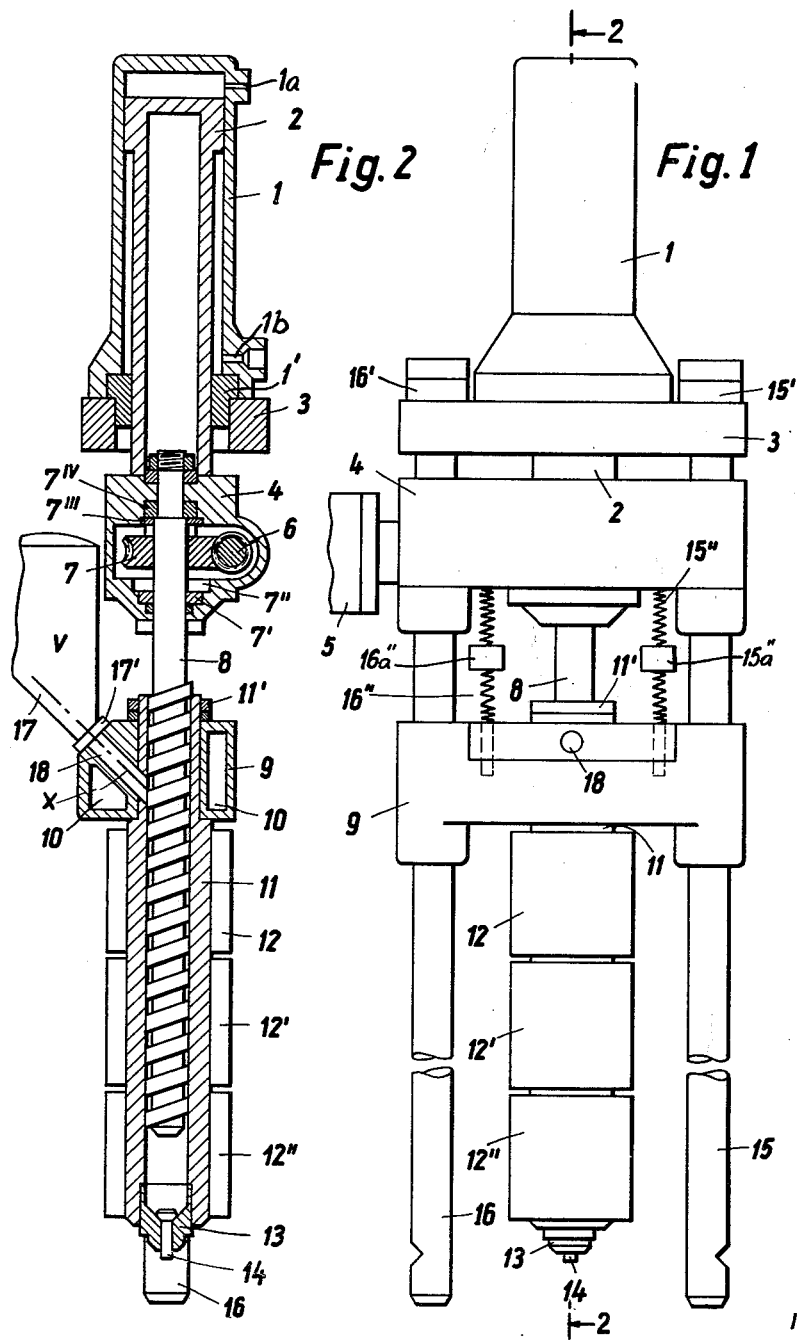

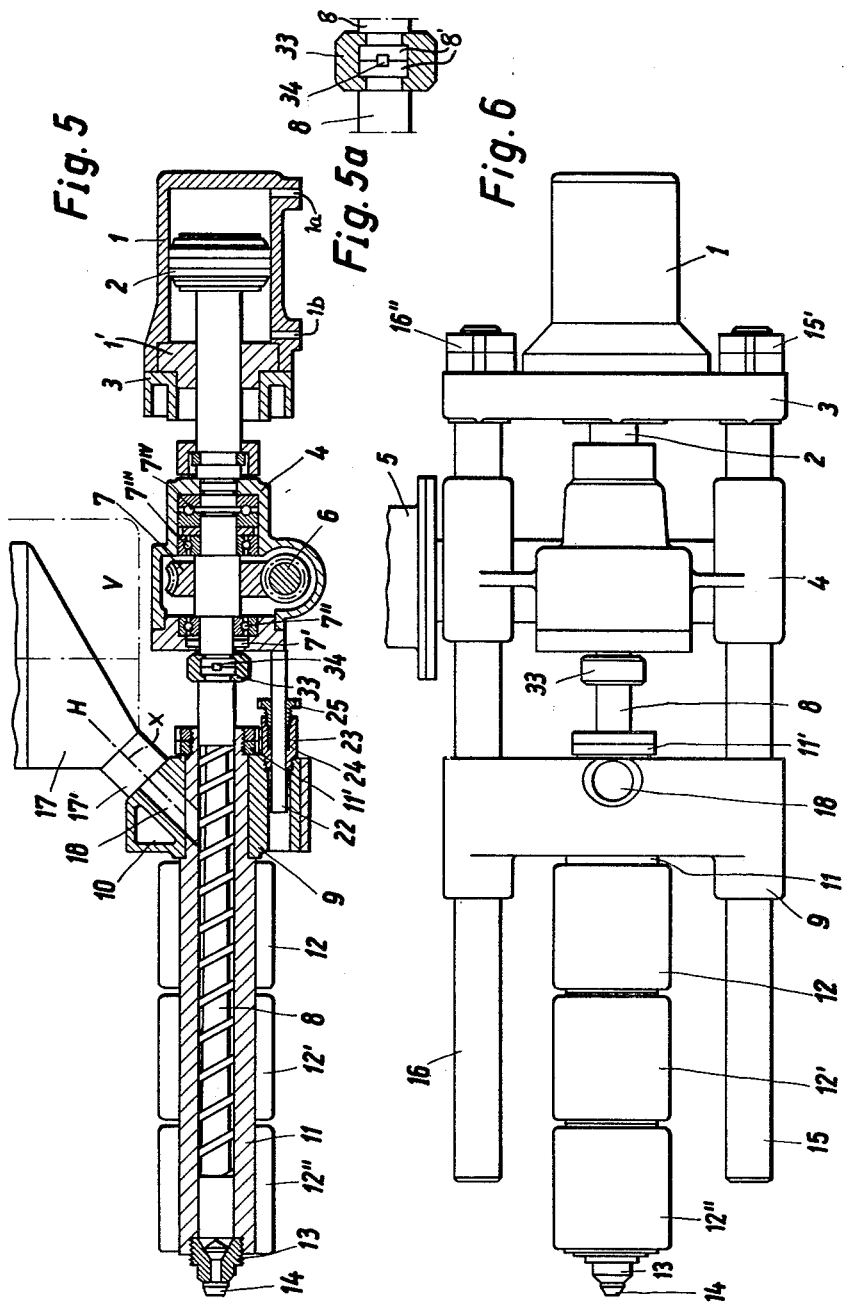

Jan. 19, 1965   K. HEHL   3,165,785
RECIPROCABLE SCREW TYPE INJECTION MOLDING UNIT
Filed June 4, 1962   4 Sheets-Sheet 4

INVENTOR
Karl Hehl
BY George B. Spencer
ATTORNEY

United States Patent Office 3,165,785
Patented Jan. 19, 1965

3,165,785
RECIPROCABLE SCREW TYPE INJECTION
MOLDING UNIT
Karl Hehl, Lossburg, Wurttemberg, Germany, assignor
to Arburg-Feingerätefabrik o.H.G., Hehl & Söhne,
Lossburg, Wurttemberg, Germany
Filed June 4, 1962, Ser. No. 199,751
Claims priority, application Germany, June 9, 1961,
A 37,615; Nov. 9, 1961, A 38,782
20 Claims. (Cl. 18—30)

The present invention relates to an injection unit for use with an injection molding machine capable of forming articles made of plastic.

More particularly, the present invention concerns an injection unit wherein a conveyer screw is slidably and rotatably mounted within an injection cylinder, the axial movement of which screw is controlled by the piston of a hydraulic drive and the rotation of which screw is effected by a suitable drive mechanism. An arrangement of this type is shown in French Patent No. 855,885, especially FIGURE 3 thereof.

In an injection unit of the above type, the thermoplastic material is normally plasticized partly by externally applied heat, for example by means of a heating jacket, and partly by the liberation of internal heat as a result of the intense deforming and working of the material by the conveyer screw.

It is an object of the present invention to provide an injection unit of the above type in which the pressure with which the thermoplastic material in the injection cylinder is conveyed upon rotation of the screw can be adjusted to any desired value. It is thanks to the fact that the pressure to which the material in the injection cylinder is subjected can be controlled, that the mechanical plasticizing, and therefore the liberation of kinetic heat resulting from the working of the material, can be increased or decreased so as to take into consideration the sensitivity and characteristics of the particular material being worked.

With the above object in view, the present invention resides basically in an injection unit which comprises (a) support means, preferably in the form of two elongated parallel struts, (b) a first component incorporating an injection cylinder, (c) a second component incorporating, firstly, a conveyer screw which is slidably and rotatably arranged in the injection cylinder and, secondly, means for rotating the conveyer screw, both of which components are mounted on the support means for independent axial movement relative thereto, and (d) connecting means which interconnect the two components and serve to retard or brake the axial movement of the two components relative to each other. These connecting means may, in practice, be constituted by two inter-engaging parts.

Additional objects and advantages of the present invention will become apparent upon consideration of the following description when taken in conjunction with the accompanying drawings in which:

FIGURE 1 is a front view of one embodiment of an injection unit according to the present invention, the unit being shown as being vertically oriented.

FIGURE 2 is a sectional view taken on line 2—2 of FIGURE 1.

FIGURE 3 is a sectional view similar to FIGURE 2, but showing the unit while horizontally oriented, with the hydraulic actuating piston being in its rearwardmost position.

FIGURE 4 is a sectional view similar to FIGURE 3, but showing the hydraulic actuating piston as being slightly forward.

FIGURE 5 is a sectional view similar to FIGURE 3 but showing another embodiment of the present invention.

FIGURE 5a is a sectional view showing a detail of the embodiment of FIGURE 5 on an enlarged scale.

FIGURE 6 is a plan view of the embodiment of FIGURE 5.

Figure 7:
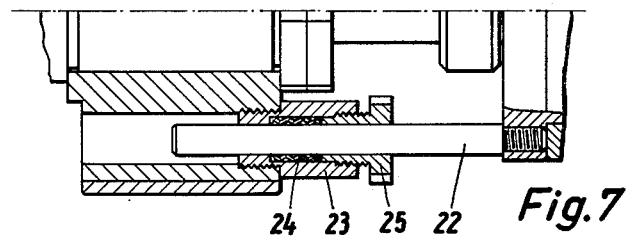
FIGURE 7 is a sectional view showing the connecting means on an enlarged scale.

Referring now to the drawings and to FIGURES 1 to 4 thereof in particular, the same show an injection unit which is connectible with the other parts of the injection molding machine (not shown) so as to occupy either a vertical position (FIGURES 1 and 2) or a horizontal position (FIGURES 3 and 4). The injection unit has two components, one of which comprises a plasticizing or injection cylinder 11 surrounded by heating jackets 12, 12', 12" and carrying at its end a nozzle 13 containing a slide element 14, as well as a transverse bridge 9 formed with interior passages 10 through which a coolant may be circulated and an inlet channel 18 through which plastic material may be supplied to the interior of the cylinder 11.

The bridge 9 is held in place by nuts 11'. Also shown is a supply receptacle 17 having an outlet channel 17' communicating with the inlet channel 18 of the bridge 9. This supply receptacle is rotatable about the axis $x$ between the position H (FIGURES 3 and 4) wherein the receptacle feeds granulated plastic material while the cylinder 11 is horizontally oriented, and a position V (shown in solid lines in FIGURE 2 and in phantom lines in FIGURES 3 and 4) wherein the receptacle feeds granulated plastic material while the cylinder is vertically oriented.

The other component is made up of a conveyor screw 8, a drive mechanism for rotating the screw, and a transverse housing 4 which rotatably mounts the conveyer screw by means of bearings $7^I$, $7^{II}$, $7^{III}$, and $7^{IV}$. The drive mechanism itself includes a drive motor 5, arranged laterally on the housing 4, a worm 6 connected to the motor 5, and a worm wheel 7 affixed to the screw 8 and in mesh with the worm 7. Attached to the housing 4 is a hydraulic piston 2.

The two components described above are slidably mounted for movement in axial direction, on support means such as two elongated parallel struts 15 and 16, so that the position of each component may be changed independently of the other. The lower free ends of the struts 15, 16 as viewed in FIGURES 1 and 2, are connectible to the injection machine as a whole, thus enabling the injection unit to occupy either a vertical or horizontal position. The opposite free ends of the struts carry a transverse plate 3 which is secured to the struts by means of nuts 15', 16'. The plate 3 carries a hydraulic cylinder 1 within which the piston 2 is slidably arranged, a suitable seal 1' being provided to close off the cylinder 1. Thanks to this arrangement, the cylinder may be aligned exactly with respect to the piston 2 and the axis which is common to the cylinder 11 and the conveyer screw 8, it being noted that all of the parts described above are arranged symmetrically with respect to the struts 15, 16. The cylinder 1 is provided with suitable ports 1a, 1b, for admitting a pressure fluid medium, the actual construction of the piston being such as to provide sufficient clearance for the admission of such medium through the respective ports (see, for instance, FIGURE 5).

According to the present invention, the two components which are movable independent of each other along the struts 15, 16, are interconnected with each other with means which retard or brake the movement of the two units toward or away from each other. The braking effect can be adjusted down to zero. In the embodiment of FIGURES 1 to 4, these connecting means are constituted by two symmetrically arranged tension springs 15", 16", whose tension is adjustable as, for example, by means of adjusting devices 15a", 16a".

When the conveyer screw 8 is rotated, the plastic granulate from the supply receptacle 17 passes through channel 18 and into the cylinder 11 where it is heated by the heating jackets 12, 12', 12". While the material is becoming viscous and is being transported toward the nozzle 13, the space within the cylinder 11 and ahead of the conveyer screw 8 becomes filled with soft plastic material and constitutes a supply chamber of known volume. After this supply chamber has, in fact, been filled, the rotation of the screw 8 is automatically stopped by means of conventional electrical controls (not shown). During this filling process, the cylinder 11, together with its bridge 9, is moved toward the mold held in place by a suitable clamping mechanism (not shown) and located, as viewed in FIGURES 1 and 2, below the cylinder 11. Here, this movement takes place against the action of the connecting means interconnecting the two components.

As stated above, the rotation of the screw is stopped once the supply chamber within the cylinder 11 has been filled. By means of suitable electrical controls (not shown), pressure fluid medium is caused to flow into port 1a, so that this medium acts on the largest surface of the piston 2. As a result, the piston 2 together with the conveyer screw component is moved axially toward the mold, the cylinder 11 being carried along until its tip engages the mold. The actual injection occurs upon continued application of force on the piston 2 and the resulting axial movement of the conveyer screw 8 within, and relative to the cylinder 11.

After the injection has been completed, the fluid medium is now introduced into port 1b, whereupon the fluid medium acts on a relatively small effective area of the piston 2. The latter, together with the conveyer screw component and the component incorporating the cylinder 11, are all moved away from the mold. The length of this return stroke can be adjusted by means of electrical switching means cooperating with the supply of pressure fluid medium fed to the cylinder 1. In practice, this return stroke will be dimensioned according to the distance which the cylinder 11 is to be moved away from the mold. As a result, the length of the return stroke of the piston 2 will be equal to the distance between the tip of the cylinder 11 from the mold at the beginning of the operation.

In the embodiment of FIGURES 5 to 7, the connecting means interconnecting the two components comprise a rod 22 slidably arranged in a sleeve-like part 23, the former being connected to the housing 4 and the latter to the bridge 9. The sleeve 23 has a section of enlarged internal diameter so that an annular chamber is formed between the inner wall of the sleeve 23 and the outer surface of the rod 22. This annular chamber is occupied by a stack of dished plastic rings 24, these rings being inclined relative to the axis of rod 22 to a greater or lesser extent. The sleeve 23 has threadedly arranged therein a tubular screw 25 which engages the first of the stacked rings 24, so that, by rotating and thereby axially moving the screw 25, the rings 24 can be pressed together with different degrees of force. In this way, the rings may be caused to assume a relatively flat position, and this, in turn, increases the frictional force with which the rings 24 engage the rod 22. The force can, of course, be regulated simply by turning the screw 25. As is clearly shown in FIGURE 7, the rings 24 are so positioned as to exert a substantial braking force when the rod 22 moves from left to right.

The above-described embodiment of the present invention incorporates a safety feature, whose details are best illustrated in FIGURE 5a. It will be appreciated that when the connecting means produce a strong braking effect which retards the movement of the two components relative to each other, the conveyer screw 8 will be subjected to large mechanical stresses. In order to prevent the screw from breaking, or to prevent the drive motor 5 from becoming overloaded and thereby damaged, the screw incorporates a strain relief device. Thus, the screw is made of two sections having flanges 8' surrounded by a coupling sleeve 33 as well as a shear pin 34 which, upon overload of the conveyer screw 8, is ruptured.

Figure 8:
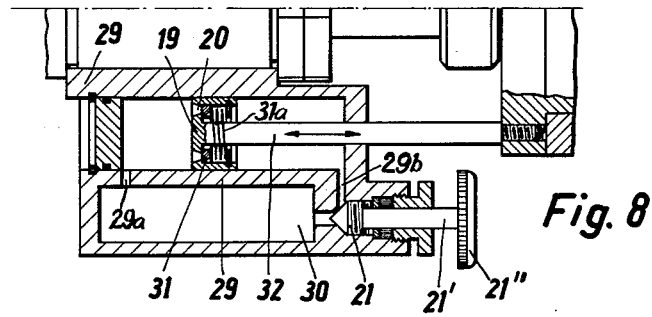
FIGURE 8 is a sectional view showing another embodiment of the connecting means according to the present invention.

In the embodiment of FIGURE 8, the connecting means between the components are constituted by a hydraulic device. The same includes a cylinder 29 provided on the injection cylinder component and a piston 19 slidably arranged in the cylinder 29, the piston 19 being attached, via a piston rod 32, to the conveyer screw component. The injection cylinder component is provided with a chamber 30 which communicates, via passages 29a, 29b with opposite ends of the cylinder 29. The effective cross section of the passage 29b is made adjustable by means of a throttle valve 21 connected, via a rod 21', to a setting knob 21". The piston 19 incorporates a non-return or check valve, constituted by passages 20 arranged along a circle about the axis of the piston and normally closed off by an annular valve 31 which is biased toward the passages 20 by a spring 31a.

The operation of the hydraulic device is as follows: during the injection stroke when the hydraulic actuator 1, 2, presses the conveyer screw 8 axially toward the mold, the piston 19 will freely move from right to left, as viewed in FIGURE 8, inasmuch as the spring 31a pressing the valve 31 against the passages 20 will yield, so that a hydraulic liquid filling the cylinder 29 and chamber 30 will not impede the leftward movement of the piston 19. It will be appreciated that this phase occurs during the time when the hydraulic piston 2 moves the cylinder and conveyer screw components toward the mold and actually carries out the injection of the thermoplastic material into the mold. Due to the fact that the piston 19 offers no appreciable resistance during the injection phase, the plasticized material is not subjected to any pressure resulting from the action of the hydraulic connecting means. This is of importance in the case of certain pressure-sensitive thermoplastic materials.

As soon as the injection is completed and the piston 2 commences its return stroke, the check valve built into the piston 19 closes so that movement of the piston 19 within the cylinder 29 is, for all practical purposes, blocked during the return stroke, the reason being that the hydraulic liquid in the cylinder 29 and chamber 30 can flow past the throttle valve only very slowly. Consequently, the injection cylinder component and the conveyer screw component will, during the return stroke brought about by the piston 2, be connected to each other so that both components will move in unison as a single entity. During this back stroke, at which time the conveyer screw 8 itself is at its forwardmost position within the cylinder 11, the screw begins its rotation. As a result, plastic material in the cylinder 11 is plasticized and transported until a given volume is collected at the front of the cylinder 11. During this process, the cylinder 11 will move toward the mold by an amount depending on the volume; the conveyer screw 8 will, during this time, not carry out any axial movement.

Inasmuch as the two components are elastically or yieldably connected to each other by the hydraulic connecting means, the axial movement of the cylinder 11 caused by the accumulation of plastic material must occur at the same time as the back stroke of the piston 19 in cylinder 29. The speed at which the piston 19 can move back is dependent on the setting of the throttle valve. Thus, the axial movement of the cylinder 11, produced by the accumulation of plastic material, is subject to a given, adjustable braking action. This braking action is increased or decreased, depending on the particular thermoplastic material involved. If the braking effect is increased, the frictional resistance to which the conveyer screw 8 is subjected in the cylinder 11 is increased, and this substantially increases the homogeneity with which the material is treated. Due to increased internal friction, more internal heat is liberated, so that, with certain thermoplastic materials, a short external heating period will suffice to make sure that the conveyer screw will produce the necessary plasticizing.

Figure 9:
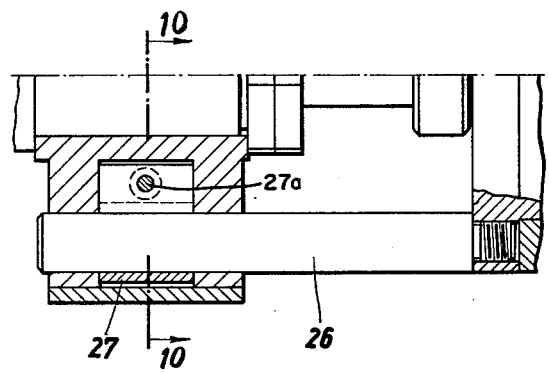
FIGURE 9 is a sectional view showing yet another embodiment of the connecting means according to the present invention.
Figure 10:
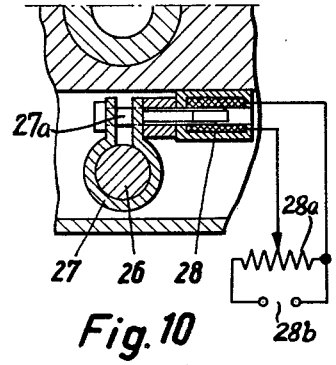
FIGURE 10 is a sectional view taken along line 10—10 of FIGURE 9, FIGURE 10 additionally showing electrical circuitry usable in conjunction with this modification.

In the embodiment of FIGURES 9 and 10, the two components are connected by means of a rod 26 attached to the housing 4 of the conveyer screw component and embraced by a clamp 27 attached to the bridge 9 of the injection cylinder component. The clamp 27 has two free end portions through which passes a bolt 27a, the same constituting, or being connected to, an armature which cooperates with an electromagnet 28. The winding of the electromagnet is connected to a potentiometer 28a across which there is a source of electricity 28b. Thus, by moving the slide of the potentiometer, the voltage across the electromagnet, and consequently the strength which it exerts on the bolt 27a, can be adjusted. This, in turn, means that the strength with which the clamp 27 embraces the rod 26 is adjustable, so that the frictional engagement between the rod 26 and clamp 27 can be set to bring about the desired degree of coupling effected by the connecting means.

In practice, the electric circuit incorporates means (not shown) which cause the magnet 28 to be energized only during rightward movement of the rod 26, as viewed in FIGURE 9.

Instead of the potentiometer arrangement, other electrical means may be provided for varying the strength of the electromagnet 28, as, for example, an arrangement incorporating an adjustable ring core transformer.

It will be seen from the above that, thanks to the present invention, the pressure on the plastic material in the cylinder 11 may be controlled by very simple means. This, in turn, allows the intensity with which the thermoplastic material is mixed and the amount of internal heat that is liberated to be regulated, simply by regulating the action of the connecting means which interconnect the injection cylinder component and the conveyer screw component.

Furthermore, the connecting means between the two components allow the same hydraulic actuator which moves the conveyer screw in axial direction, namely, the cylinder 1 and piston 2, also to move the cylinder 11 toward and away from the mold. In this way, a separate hydraulic actuator becomes unnecessary.

It will be understood that the above description of the present invention is susceptible to various modifications, changes, and adaptations, and the same are intended to be comprehended within the meaning and range of equivalents of the appended claims.

What is claimed is:

1. An injection unit for thermoplastic material, comprising, in combination:
   (a) support means;
   (b) a first component incorporating an injection cylinder, said first component being mounted on said support means for axial movement relative thereto;
   (c) a second component incorporating a conveyer screw slidably and rotatably arranged in said injection cylinder and means for rotating said conveyer screw, said second component being likewise mounted on said support means for axial movement relative thereto;
   (d) connecting means interconnecting said components for retarding the axial movement of said two components relative to each other at least when said components move away from each other, said connecting means permitting movement of said components toward each other; and
   (e) a single drive means effective to move each of said components axially with respect to said support means, said drive means being connected to and acting directly on said second component; said driving means, when acting to move said second component away from said first component, also acting, through the intermediary of said connecting means, on said first component thereby to move the latter in the same direction as said second component.

2. An injection unit as defined in claim 1 wherein said connecting means comprise two slidably interfitting parts connected to said two components, respectively.

3. An injection unit as defined in claim 2 wherein said slidably interfitting parts are constituted by a hydraulic device incorporating a cylinder and a piston slidably arranged therein.

4. An injection unit as defined in claim 3 wherein said hydraulic device further incorporates means forming a communication between opposite ends of said cylinder, a throttle valve arranged in said communication, and a check valve for preventing the flow of a hydraulic medium in one direction.

5. An injection unit as defined in claim 4 wherein said check valve is built into said piston.

6. An injection unit as defined in claim 4 wherein said throttle valve is adjustable.

7. An injection unit as defined in claim 2 wherein one of said interfitting parts is a hollow sleeve and the other of said parts is a rod slidably arranged within said sleeve, the outer surface of said rod and the inner surface of said sleeve forming an annular chamber between themselves, said annular chamber being occupied by deformable means which frictionally couple said rod and sleeve.

8. An injection unit as defined in claim 7, further comprising means for adjusting the frictional force with which said deformable means couple said rod and sleeve.

9. An injection unit as defined in claim 8 wherein said deformable means comprise a stack of dished rings and wherein said adjusting means comprise a hollow screw threaded into said sleeve and engaging the first of said stack of rings.

10. An injection unit as defined in claim 9 wherein said rings are made of plastic.

11. An injection unit as defined in claim 2 wherein one of said interfitting parts is a clamp and the other of said parts is a rod slidably held by said clamp.

12. An injection unit as defined in claim 11, further comprising means for adjusting the force with which said clamp frictionally engages said rod.

13. An injection unit as defined in claim 12 wherein said clamp embraces said rod and has two parallel free ends, and wherein said adjusting means comprise a connecting element for holding said ends together, and electromagnetic means for exerting a force on said connecting element, whereby the force with which said clamp frictionally engages said rod may be adjusted by varying the amount of electric energy supplied to said electromagnetic means.

14. An injection unit as defined in claim 1 wherein said connecting means comprise spring means.

15. An injection unit as defined in claim 14 wherein said spring means comprise tension spring means and means for adjusting the tension exerted thereby.

16. An injection unit as defined in claim 1 wherein said second component incorporates strain relief means interposed between said conveyer screw and said rotating means therefor.

17. An injection unit as defined in claim 1 wherein said driven means comprise a hydraulic actuator.

18. An injection unit as defined in claim 17 wherein said hydraulic actuator comprises a hydraulic cylinder mounted on said support means and a piston connected to said second component and slidably arranged within said hydraulic cylinder.

19. An injection unit as defined in claim 17 wherein said hydraulic actuating device further comprises means communicating with both ends of said hydraulic cylinder for introducing a pressure fluid medium thereinto, thereby allowing said piston to be moved in either direction.

20. An injection unit as defined in claim 1 wherein said connecting means are arranged to offer substantially no resistance to the movement of said components relative to each other when said components are moved toward each other.

References Cited by the Examiner

UNITED STATES PATENTS

| | | | |
|---|---|---|---|
| 1,922,937 | 8/33 | Eckert | 18—30 |
| 2,273,713 | 2/42 | Lawyer | 18—30 |
| 2,433,654 | 12/47 | Dinzl | 18—30 |
| 2,629,132 | 2/53 | Willcox et al. | 18—30 |
| 2,734,226 | 2/56 | Willert | 18—12 |
| 3,020,591 | 2/62 | Breher et al. | 18—30 |
| 3,068,521 | 12/62 | Gaspar et al. | 18—30 |

FOREIGN PATENTS 635,962  4/50  Great Britain.

MICHAEL V. BRINDISI, *Primary Examiner.*